US009506591B2

(12) United States Patent
German, Jr. et al.

(10) Patent No.: US 9,506,591 B2
(45) Date of Patent: Nov. 29, 2016

(54) SELF-RESTRAINED PIPE JOINT METHOD OF ASSEMBLY

(71) Applicant: Mueller International, LLC, Atlanta, GA (US)

(72) Inventors: Mikhail German, Jr.; Leo W. Fleury, Jr., North Smithfield, RI (US)

(73) Assignee: Mueller International, LLC, Atlanta, GA (US)

( * ) Notice: Subject to any disclaimer, the term of this patent is extended or adjusted under 35 U.S.C. 154(b) by 213 days.

(21) Appl. No.: 14/469,755

(22) Filed: Aug. 27, 2014

(65) Prior Publication Data
US 2014/0360004 A1    Dec. 11, 2014

Related U.S. Application Data

(62) Division of application No. 12/902,888, filed on Oct. 12, 2010, now Pat. No. 8,857,861.

(60) Provisional application No. 61/250,742, filed on Oct. 12, 2009.

(51) Int. Cl.
*F16L 21/04* (2006.01)
*F16L 37/084* (2006.01)
*F16L 21/08* (2006.01)
*F16L 19/04* (2006.01)
*F16L 17/025* (2006.01)

(52) U.S. Cl.
CPC ............ *F16L 37/0845* (2013.01); *F16L 21/04* (2013.01); *F16L 21/08* (2013.01); *F16L 17/025* (2013.01); *F16L 19/045* (2013.01); *Y10T 29/4995* (2015.01); *Y10T 29/49872* (2015.01)

(58) Field of Classification Search
CPC .................. Y10T 29/49872; Y10T 29/49963; F16L 17/025; F16L 19/045; F16L 21/08; F16L 21/04; F16L 37/0845
See application file for complete search history.

(56) References Cited

U.S. PATENT DOCUMENTS

| 784,400 | A | 3/1905 | Howe |
| 1,818,493 | A | 8/1931 | McWane |
| 2,032,492 | A | 3/1936 | Nathan |
| 2,201,372 | A | 5/1940 | Miller |

(Continued)

FOREIGN PATENT DOCUMENTS

| AU | 2011293430 | 8/2010 |
| AU | 2010303881 | 3/2015 |

(Continued)

OTHER PUBLICATIONS

Holmes IV, William W.; Final Office Action for U.S. Appl. No. 12/711,050, filed Feb. 23, 2010, mailed Apr. 2, 2014, 53 pgs.

(Continued)

*Primary Examiner* — Jermie Cozart
(74) *Attorney, Agent, or Firm* — Taylor English Duma LLP

(57) ABSTRACT

A self-restrained pipe joint system and method of assembly to connect two lengths of pipe in a mechanical joint, which maximizes the advantages of both restrained push-on joints as well as mechanical joints, as are known commonly in the art. The invention has application to long-run pipe lengths as well as to appurtenances, including fittings and connections. The gasket contains locking members that act to restrain separation upon the instance of any force tending to separate the connected pipe lengths.

22 Claims, 9 Drawing Sheets

(56) References Cited

U.S. PATENT DOCUMENTS

| | | |
|---|---|---|
| 2,230,725 A | 2/1941 | Nathan |
| 2,398,399 A | 4/1946 | Alexander |
| 2,647,002 A | 7/1953 | Brummer |
| 2,953,398 A | 9/1960 | Haugen et al. |
| 3,048,415 A | 8/1962 | Shook |
| 3,078,332 A | 2/1963 | Marx |
| 3,306,622 A | 2/1967 | Liebig |
| 3,331,611 A | 7/1967 | Liebig |
| 3,445,120 A | 5/1969 | Barr |
| 3,724,880 A | 4/1973 | Seiler |
| 3,815,940 A | 6/1974 | Luckenbill |
| 3,857,589 A | 12/1974 | Oostenbrink |
| 3,899,183 A | 8/1975 | Wild et al. |
| 3,963,298 A | 6/1976 | Seiler |
| 4,034,994 A | 7/1977 | Ohta et al. |
| 4,040,651 A | 8/1977 | LaBranche |
| 4,229,026 A | 10/1980 | Seiler |
| 4,299,412 A | 11/1981 | Parmann |
| 4,643,466 A | 2/1987 | Conner et al. |
| 4,664,426 A | 5/1987 | Ueki |
| 4,834,398 A | 5/1989 | Guzowski et al. |
| 4,916,799 A | 4/1990 | Skinner et al. |
| 4,991,858 A | 2/1991 | Abila et al. |
| 5,067,751 A | 11/1991 | Walworth et al. |
| 5,197,768 A | 3/1993 | Conner |
| 5,269,569 A | 11/1993 | Weber et al. |
| 5,295,697 A | 3/1994 | Weber et al. |
| 5,297,824 A | 3/1994 | Imhof et al. |
| 5,297,826 A | 3/1994 | Percebois et al. |
| 5,303,935 A | 4/1994 | Saksun |
| 5,316,352 A | 5/1994 | Smith |
| 5,335,946 A | 8/1994 | Dent et al. |
| 5,360,218 A | 11/1994 | Percebois et al. |
| 5,393,107 A | 2/1995 | Vobeck |
| 5,398,980 A * | 3/1995 | Hunter ............... F16L 21/08 285/337 |
| 5,464,228 A | 11/1995 | Weber et al. |
| 5,520,419 A | 5/1996 | DeBoalt et al. |
| 5,580,068 A | 12/1996 | Gundy |
| 5,779,285 A | 7/1998 | Robison |
| 5,853,655 A | 12/1998 | Baker |
| 5,988,695 A | 11/1999 | Corbett |
| 6,062,611 A | 5/2000 | Percebois et al. |
| 6,142,484 A | 11/2000 | Valls |
| 6,152,494 A | 11/2000 | Corbett et al. |
| 6,220,635 B1 | 4/2001 | Vitel et al. |
| 6,299,176 B1 | 10/2001 | Guzowski et al. |
| 6,457,718 B1 | 10/2002 | Quesada |
| 6,488,319 B2 | 12/2002 | Jones |
| 6,488,583 B1 | 12/2002 | Jones et al. |
| 6,499,744 B1 | 12/2002 | Quesada |
| 6,502,867 B2 | 1/2003 | Holmes, IV et al. |
| 6,550,500 B2 | 4/2003 | Jarvenkyla et al. |
| 6,688,652 B2 | 2/2004 | Holmes, IV et al. |
| 6,945,570 B2 | 9/2005 | Jones |
| 6,947,443 B1 | 9/2005 | Corbett |
| 6,974,160 B2 | 12/2005 | Jones |
| D514,671 S | 2/2006 | Jones |
| 7,093,863 B2 | 8/2006 | Holmes, IV |
| 7,104,573 B2 | 9/2006 | Copeland |
| 7,108,289 B1 | 9/2006 | Holmes, IV |
| 7,125,054 B2 | 10/2006 | Jones |
| 7,134,204 B2 | 11/2006 | Corbett et al. |
| 7,137,653 B2 | 11/2006 | Copeland |
| 7,140,618 B2 | 11/2006 | Valls, Jr. |
| 7,207,606 B2 | 4/2007 | Owen et al. |
| D553,716 S | 10/2007 | Lockard |
| 7,284,310 B2 | 10/2007 | Jones et al. |
| D556,866 S | 12/2007 | Darce |
| D556,867 S | 12/2007 | Darce |
| D557,386 S | 12/2007 | Darce |
| D557,387 S | 12/2007 | Darce |
| D557,771 S | 12/2007 | Darce |
| D558,310 S | 12/2007 | Quesada |
| 7,310,867 B2 | 12/2007 | Corbett |
| D559,363 S | 1/2008 | Darce |
| 7,328,493 B2 | 2/2008 | Jones et al. |
| 7,354,073 B2 | 4/2008 | Sakamoto |
| 7,392,989 B2 | 7/2008 | Corbett |
| 7,401,819 B2 | 7/2008 | Gibb et al. |
| 7,404,872 B2 | 7/2008 | Fisher |
| D574,934 S | 8/2008 | Darce et al. |
| 7,410,174 B2 | 8/2008 | Jones et al. |
| 7,441,319 B2 | 10/2008 | Corbett et al. |
| 7,509,724 B2 | 3/2009 | Corbett et al. |
| 7,513,536 B2 | 4/2009 | Corbett et al. |
| 7,537,248 B2 | 5/2009 | Jones et al. |
| 7,618,071 B2 | 11/2009 | Jones et al. |
| 7,789,431 B2 | 9/2010 | Freudendahl |
| 8,096,585 B2 | 1/2012 | Vitel et al. |
| 8,511,690 B2 | 8/2013 | Holmes, IV |
| 8,511,691 B2 | 8/2013 | Holmes, IV |
| 8,528,184 B2 | 9/2013 | Holmes |
| 8,533,926 B2 | 9/2013 | Holmes, IV et al. |
| 8,544,851 B2 | 10/2013 | Holmes, IV et al. |
| 8,857,861 B2 | 10/2014 | German |
| 8,870,188 B2 | 10/2014 | Holmes, IV |
| 8,925,977 B2 | 1/2015 | Holmes, IV |
| 9,121,532 B2 | 9/2015 | Holmes, IV et al. |
| 9,194,519 B2 | 11/2015 | Holmes, IV et al. |
| 2002/0017789 A1 | 2/2002 | Holmes |
| 2003/0107214 A1 | 6/2003 | Holmes |
| 2004/0130103 A1 | 7/2004 | Corbett |
| 2004/0140625 A1 | 7/2004 | Valls, Jr. |
| 2004/0150170 A1 | 8/2004 | Shaffer et al. |
| 2004/0232627 A1 | 11/2004 | Corbett |
| 2004/0232698 A1* | 11/2004 | Jones ............... F16L 21/04 285/339 |
| 2004/0232699 A1* | 11/2004 | Jones ............... F16L 21/04 285/421 |
| 2004/0234776 A1 | 11/2004 | Corbett |
| 2005/0046189 A1 | 3/2005 | Corbett, Jr. et al. |
| 2006/0071431 A1 | 4/2006 | Corbett, Jr. |
| 2006/0125193 A1 | 6/2006 | Corbett, Jr. et al. |
| 2006/0181031 A1 | 8/2006 | Corbett, Jr. et al. |
| 2007/0063516 A1 | 3/2007 | Jones et al. |
| 2007/0200005 A1 | 8/2007 | Corbett et al. |
| 2007/0210528 A1 | 9/2007 | Baber |
| 2007/0216112 A1 | 9/2007 | Percebois et al. |
| 2008/0001401 A1 | 1/2008 | Quesada et al. |
| 2008/0007057 A1 | 1/2008 | Schmuck et al. |
| 2008/0007062 A1 | 1/2008 | Jones et al. |
| 2008/0012239 A1 | 1/2008 | Corbett et al. |
| 2008/0018017 A1 | 1/2008 | Quesada |
| 2008/0018057 A1 | 1/2008 | Gibb et al. |
| 2008/0111319 A1 | 5/2008 | Nowack et al. |
| 2008/0157524 A1 | 7/2008 | Jones et al. |
| 2008/0272595 A1 | 11/2008 | Gibb et al. |
| 2008/0277884 A1 | 11/2008 | Corbett et al. |
| 2008/0284166 A1 | 11/2008 | Darce et al. |
| 2008/0290652 A1 | 11/2008 | Gibb et al. |
| 2008/0303220 A1 | 12/2008 | Darce et al. |
| 2009/0060635 A1 | 3/2009 | Jones et al. |
| 2009/0152863 A1 | 6/2009 | Steinbruck |
| 2009/0200705 A1 | 8/2009 | Mora |
| 2009/0209353 A1 | 8/2009 | Abels et al. |
| 2009/0273184 A1 | 11/2009 | Wright et al. |
| 2010/0045029 A1 | 2/2010 | Yousef et al. |
| 2010/0078937 A1 | 4/2010 | Jones et al. |
| 2010/0090460 A1 | 4/2010 | Vitel et al. |
| 2010/0225111 A1 | 9/2010 | Owen |
| 2011/0024995 A1 | 2/2011 | Schaefer et al. |
| 2011/0266752 A1 | 11/2011 | Kocurek et al. |

FOREIGN PATENT DOCUMENTS

| | | |
|---|---|---|
| AU | 2011258534 | 5/2015 |
| GB | 2161233 | 1/1986 |
| JP | 5311271 | 2/1978 |

(56) References Cited

FOREIGN PATENT DOCUMENTS

| JP | 5312517 | 2/1978 |
|---|---|---|
| WO | 2011043836 | 4/2011 |

OTHER PUBLICATIONS

Holmes IV, William W.; Non-Final Office Action for U.S. Appl. No. 12/711,050, filed Feb. 23, 2010; mailed Nov. 10, 2011; 24 pages.
Holmes IV, William W., Patent Application Entitled: Simplified Low Insertion Force Sealing Device Capable of Self Restraint and Joint Deflection; U.S. Appl. No. 12/711,050, filed Feb. 23, 2010; 31 pgs.
Holmes IV, William W., Restriction Requirement for U.S. Appl. No. 12/711,050, filed Feb. 23, 2010; mailed Mar. 17, 2011; 6 pages.
Holmes IV, William W., Restriction Requirement for U.S. Appl. No. 12/711,050, filed Feb. 23, 2010; mailed Sep. 15, 2011; 7 pages.
Holmes IV, William W.; Final Office Action for U.S. Appl. No. 12/711,050, filed Feb. 23, 2010, mailed Apr. 11, 2013; 30 pgs.
Holmes IV, William W.; Final Office Action for U.S. Appl. No. 12/711,050, filed Feb. 23, 2010, mailed Feb. 16, 2012; 22 pgs.
Holmes IV, William W.; Final Office Action for U.S. Appl. No. 12/711,050, filed Feb. 23, 2010, mailed Aug. 29, 2012; 26 pgs.
Holmes IV, William W.; Non-Final Office Action for U.S. Appl. No. 12/711,050, filed Feb. 23, 2010, mailed Jul. 22, 2013, 33 pgs.
Holmes IV, William W.; Notice of Allowance for U.S. Appl. No. 12/711,050, filed Feb. 23, 2010, mailed Aug. 28, 2014, 29 pgs.
Holmes IV, William W.; Applicant-Initiated Interview Summary for U.S. Appl. No. 12/711,050, filed Feb. 23, 2010, mailed Oct. 17, 2012; 5 pgs.
Holmes IV, William W.; Applicant-Initiated Interview Summary for U.S. Appl. No. 12/711,050, filed Feb. 23, 2010, mailed Aug. 29, 2012; 3 pgs.
Holmes IV, William W.; Non-Final Office Action for U.S. Appl. No. 12/711,050, filed Feb. 23, 2010, mailed May 9, 2012; 20 pgs.
Holmes IV, William W.; Non-Final Office Action for U.S. Appl. No. 12/711,050, filed Feb. 23, 2010, mailed Dec. 20, 2012, 23 pgs.
Holmes IV, William W.; Applicant-Initiated Interview Summary for U.S. Appl. No. 12/711,050, filed Feb. 23, 2010, mailed Mar. 27, 2012; 3 pgs.
Holmes IV, William W.; Patent Application Entitled: Simplified Low Insertion Force Sealing Device Capable of Self Restraint and Joint Deflection; U.S. Appl. No. 13/103,126, filed May 9, 2011; 28 pgs.
Holmes IV, William W.; Issue Notification for U.S. Appl. No. 13/103,126, filed May 9, 2011, mailed Aug. 28, 2013, 1 pg.
Holmes IV, William W.; Non-Final Office Action for U.S. Appl. No. 13/103,126, filed May 9, 2011, mailed Apr. 2, 2013, 27 pgs.
Holmes IV, William W.; Notice of Allowance for U.S. Appl. No. 13/103,126, filed May 9, 2011, mailed Jul. 11, 2013, 14 pgs.
Holmes IV, William W.; Patent Application Entitled: Simplified Low Insertion Force Sealing Device Capable of Self Restraint and Joint Deflection; U.S. Appl. No. 13/284,915, filed Oct. 30, 2011; 27 pgs.
Holmes IV, William W.; Applicant Interview Summary for U.S. Appl. No. 13/284,915, filed Oct. 30, 2011, mailed Aug. 27, 2014, 5 pgs.
Holmes IV, William W.; Final Office Action for U.S. Appl. No. 13/284,915, filed Oct. 30, 2011, mailed Aug. 1, 2014, 21 pgs.
Holmes IV, William W.; Non-Final Office Action for U.S. Appl. No. 13/284,915, filed Oct. 30, 2011, mailed Apr. 2, 2014, 64 pgs.
Holmes IV, William W., Applicant-Initiated Interview Summary for U.S. Appl. No. 13/284,915, filed Oct. 30, 2011, mailed Mar. 16, 2012, 3 pgs.
Holmes IV, William W.; Final Office Action for U.S. Appl. No. 13/284,915, filed Oct. 30, 2011, mailed Apr. 10, 2012; 29 pgs.
Holmes IV, William W.; Non-Final Office Action for U.S. Appl. No. 13/284,915, filed Oct. 30, 2011; mailed Dec. 7, 2011, 9 pages.
Holmes IV, William W.; Non-Final Office Action for U.S. Appl. No. 13/113,684, filed May 23, 2011, mailed Apr. 12, 2012; 9 pgs.
Holmes IV, William W.; Final Office Action for U.S. Appl. No. 13/113,684, filed May 23, 2011, mailed Mar. 4, 2013; 22 pgs.
Holmes IV, William W.; Issue Notification for U.S. Appl. No. 13/113,684, filed May 23, 2011, mailed Jul. 31, 2013; 1 pg.
Holmes IV, William W.; Non-Final Office Action for U.S. Appl. No. 13/113,684, filed May 23, 2011, mailed Nov. 9, 2012; 25 Pgs.
Holmes IV, William W.; Notice of Allowance for U.S. Appl. No. 13/113,684, filed May 23, 2011, mailed Jun. 28, 2013; 16 pgs.
Holmes IV, William W.; Restriction Requirement for U.S. Appl. No. 13/113,684, filed May 23, 2011, mailed Mar. 5, 2012, 6 pgs.
Holmes IV, William W.; U.S. Patent Application Entitled: Simplified Low Insertion Force Sealing Device Capable of Self Restraining and Joint Deflection under U.S. Appl. No. 13/113,684, filed May 23, 2011, 29 pgs.
Holmes IV, William; Final Office Action for U.S. Appl. No. 13/113,684, filed May 23, 2011, mailed Jul. 20, 2012, 9 pgs.
Holmes IV, William W.; Applicant Initiated Interview Summary for U.S. Appl. No. 13/475,353, filed May 18, 2012, mailed Apr. 12, 2013, 3 pgs.
Holmes IV, William W.; Final Office Action for U.S. Appl. No. 13/475,353, filed May 18, 2012, mailed Jan. 25, 2013; 15 pgs.
Holmes IV, William W.; Issue Notification for U.S. Appl. No. 13/475,353, filed May 18, 2012, mailed Jul. 31, 2013, 1 pgs.
Holmes IV, William W.; Notice of Allowance for U.S. Appl. No. 13/475,353, filed May 18, 2012, mailed May 17, 2013, 16 pgs.
Holmes IV, William W.; Non-Final Office Action for U.S. Appl. No. 13/475,353, filed May 18, 2012, mailed Oct. 16, 2012; 20 pgs.
Holmes IV, William W.; U.S. Patent Application Entitled: Simplified Low Insertion Force Sealing Device Capable of Self Restraint and Joint Deflection, U.S. Appl. No. 13/475,353, filed May 18, 2012, 28 pgs.
Holmes IV, William W.; Issue Notification for U.S. Appl. No. 13/475,335, filed May 18, 2012, mailed Aug. 21, 2013, 1 pg.
Holmes IV, William W.; Notice of Allowance for U.S. Appl. No. 13/475,335, filed May 18, 2012, mailed Jul. 11, 2013, 12 pgs.
Holmes IV, William W.; Non-Final Office Action for U.S. Appl. No. 13/475,335, filed May 18, 2012, mailed Apr. 3, 2013, 28 pgs.
Holmes IV, William W.; U.S. Patent Application Entitled: Simplified Low Insertion Force Sealing Device Capable of Self Restraint and Joint Deflection, U.S. Appl. No. 13/475,335, filed May 18, 2012, 28 pgs.
Holmes IV, William W.; Advisory Action for U.S. Appl. No. 13/216,523, filed Aug. 24, 2011, mailed May 27, 2014, 4 pgs.
Holmes IV, William W.; Final Office Action for U.S. Appl. No. 13/216,523, filed Aug. 24, 2011, mailed Apr. 1, 2014, 11 pgs.
Holmes IV, William W.; Non-Final Office Action for U.S. Appl. No. 13/216,523, filed Aug. 24, 2011, mailed Dec. 18, 2013; 14 pgs.
Holmes IV, William W.; Non-Final Office Action for U.S. Appl. No. 13/216,523, filed Aug. 24, 2011, mailed Aug. 27, 2014, 19 pgs.
Holmes IV, William W.; Non Final Office Action for U.S. Appl. No. 13/216,523, filed Aug. 24, 2011, mailed Feb. 15, 2012, 9 pgs.
Holmes IV, William W.; U.S. Patent Application Entitled: Gasket for Parabolic Ramp Self Restraining Bell Joint under U.S. Appl. No. 13/216,523, filed Aug. 24, 2011, 34 pgs.
Holmes IV, William W.; Final Office Action for U.S. Appl. No. 13/216,523, filed Aug. 24, 2011, mailed Aug. 26, 2013; 51 pgs.
Bridges, J.S. "The Evolution of Piping", Handbook of Cast Iron Pipe for Water, Gas, Steam, Air, Chemicals and Abrasives, May 1927, 3 pgs.
Article entitled, "Rubber-Gasket Joints for Ductile-Iron Pressure Pipe and Fittings", American Water Works Association, Mar. 1, 2007, 3 pgs.
Fisher, Virginia E. "The History of United States Pipe and Foundry Company: A Centennial Celebration", Mar. 1999, 4 pgs.
Article entitled, "Integrated Operation of United States Pipe and Foundry Company", United States Pipe and Foundry Company, 1956, 3 pgs.
Article entitled, "Ductile Iron Pipe", located at www.uspipe.com/Main/Default.asp?CategoryID=4&SubCategoryID = 1 accessed on Jul. 12, 2012; publicly available prior to Oct. 12, 2009; 1 pg.
Article entitled, "Joint Restraint", located at www.uspipe.com/main/Default.asp?CategoryID=4&SubCategoryID=5 accessed on Jul. 12, 2012; publically available prior to Oct. 12, 2009; 2 pgs.

(56) References Cited

OTHER PUBLICATIONS

Holmes IV, William W.; U.S. Patent Application Entitled: Gasket for Parabolic Ramp Self Restraining Bell Joint, U.S. Appl. No. 13/543,763, filed Jul. 6, 2012; 39 pgs.
Holmes IV, William W.; Non-Final Office Action for U.S. Appl. No. 13/543,763, filed Jul. 6, 2012, mailed Mar. 26, 2013, 25 pgs.
Holmes IV, William W.; Notice of Allowance for U.S. Appl. No. 13/543,763, filed Jul. 6, 2012, mailed May 24, 2013, 13 pgs.
Holmes IV, Willlaim W.; Issue Notification for U.S. Appl. No. 13/543,763, filed Jul. 6, 2012, mailed Sep. 11, 2013, 1 pg.
Holmes IV, William W.; Non-Final Office Action for U.S. Appl. No. 13/955,692, filed Jul. 31, 2013, mailed Oct. 1, 2013, 33 pgs.
Holmes IV, William W.; Non-Final Office Action for U.S. Appl. No. 13/955,692, filed Jul. 31, 2013, mailed Jan. 17, 2014, 15 pgs.
Holmes IV, William W.; Final Office Action for U.S. Appl. No. 13/955,692, filed Jul. 31, 2013, mailed May 6, 2014, 14 pgs.
Holmes IV, William W.; Final Office Action for U.S. Appl. No. 13/955,692, filed Jul. 31, 2013, mailed Jul. 22, 2014, 9 pgs.
Holmes IV, William W.; Notice of Allowance for U.S. Appl. No. 13/955,692, filed Jul. 31, 2013, mailed Aug. 21, 2014, 9 pgs.
Holmes, IV, William W.; U.S. Patent Application entitled: Gasket for Parabolic Ramp Self Restraining Bell Joint; U.S. Appl. No. 14/448,655, filed Jul. 31, 2014; 41 pgs.
German, Mikhail; Non Final Office Action for U.S. Appl. No. 12/902,888, filed Oct. 12, 2010, mailed Jul. 23, 2012; 12 pgs.
German, Mikhail; U.S. Patent Application entitled: Self-Restrained Pipe Joint System and Method of Assembly, having U.S. Appl. No. 12/902,888, filed Oct. 12, 2010; 24 pgs.
German, Mikhail; Restriction Requirement for U.S. Appl. No. 12/902,888, filed Oct. 12, 2010; mailed May 29, 2012; 7 pages.
German, Mikhail; Applicant-Initiated Interview Summary for U.S. Appl. No. 12/902,888, filed Oct. 12, 2010, mailed Oct. 31, 2012, 3 pgs.
German, Mikhail; Final Office Action for U.S. Appl. No. 12/902,888, filed Oct. 21, 2010, mailed Jan. 28, 2013; 30 pgs.
German, Mikhail; Applicant-Initiated Interview Summary for U.S. Appl. No. 12/902,888, filed Oct. 12, 2010, mailed Apr. 4, 2013, 3 pgs.
German, Mikhail; Applicant-Initiated Interview Summary for U.S. Appl. No. 12/902,888, filed Oct. 12, 2010, mailed Apr. 16, 2013, 3 pgs.
German, Mikhail; Notice of Allowance for U.S. Appl. No. 12/902,888, filed Oct. 12, 2010, mailed May 27, 2014, 44 pgs.
Holmes IV, William W.; PCT Application entitled: Simplified Low Insertion Force Sealing Device Capable of Self Restraint and Joint Deflection having serial No. PCT/US10/25074, filed Feb. 23, 2010, 31 pgs.
Holmes IV, William W.; International Search Report and Written Opinion for serial No. PCT/US10/025074, filed Feb. 23, 2010, mailed Apr. 21, 2010, 2 pgs.
Holmes IV, William W.; International Preliminary Report on Patentability for serial No. PCT/US10/025074, filed Feb. 23, 2010, mailed Apr. 11, 2012, 8 pgs.
Holmes IV, William W.; Australian Patent Examination Report for serial No. 2010303881, filed Apr. 23, 2012, mailed Jun. 16, 2014, 4 pgs.
Holmes IV William W.; PCT Application Entitled: Simplified Low Insertion Force Sealing Device Capable of Self Restraint and Joint Deflection under application No. PCT/US11/37565, filed May 23, 2011; 29 pgs.
Holmes IV William W.; International Search Report and Written Opinion for application No. PCT/US11/37565; filed May 23, 2011; mailed Sep. 8, 2011; 9 pages.
Holmes IV, William W.; International Preliminary Report on Patentability for serial No. PCT/US2011/037565, filed May 23, 2011, mailed Sep. 8, 2011, 7 pgs.
Holmes IV, William W.; PCT Patent Application Entitled: Gasket for Parabolic Ramp Self Restraining Bell Joint under application No. PCT/US11/48953, filed Aug. 24, 2011, 34 pgs.
Holmes IV, William W.; International Search Report and Written Opinion for serial No. PCT/US2011/048953, filed Aug. 24, 2011, mailed Apr. 3, 2012; 10 pgs.

Holmes IV, William W.; International Preliminary Report on Patentability for serial No. PCT/US2011/048953, filed Aug. 24, 2011, mailed Feb. 26, 2013; 6 pgs.
Holmes IV, William W.; U.S. Provisional Patent Application entitled: Parabolic Ramp Self-Restraining Bell Joint having U.S. Appl. No. 61/250,160, filed Oct. 9, 2009, 19 pgs.
Holmes IV, William W.; U.S. Provisional Patent Application entitled: Simplified Low Insertion Force Sealing Device Capable of Self Restraint and Joint Deflection having U.S. Appl. No. 61/347,612, filed May 24, 2010, 32 pgs.
Holmes IV, William W.; U.S. Provisional Patent Application Entitled: Gasket for Parabolic Ramp Self Restraining Bell Joint under U.S. Appl. No. 61/376,450, filed Aug. 24, 2010, 37 pgs.
Holmes IV, William W.; U.S. Provisional Patent Application entitled: Self-Restrained Pipe Joint System and Method of Assembly having U.S. Appl. No. 61/250,742, filed Oct. 12, 2009, 19 pgs.
Holmes IV, William W.; U.S. Patent Application entitled: Gasket for Parabolic Ramp Self Restraining Bell Joint, having U.S. Appl. No. 13/955,692, filed Jul. 31, 2013, 41 pgs.
Holmes IV, William W.; U.S. Provisional Patent Application entitled: Simplified Low Insertion Force Sealing Device Capable of Self Restraint and Deflection having U.S. Appl. No. 61/301,462, filed Feb. 4, 2010, 29 pgs.
Holmes, William W.; Issue Notification for U.S. Appl. No. 13/216,523, filed Aug. 24, 2011, mailed Nov. 4, 2015, 1 pg.
Holmes, IV, William W.; Non-Final Office Action for U.S. Appl. No. 13/216,523, filed Aug. 24, 2011, mailed Apr. 1, 2015, 16 pgs.
Holmes IV, William W.; Non-Final Office Action for U.S. Appl. No. 14/448,655, filed Jul. 31, 2014, mailed Mar. 27, 2015, 12 pgs.
Owen, William; Extended European Search Report for serial No. 11787192.1, filed May 23, 2011, mailed Apr. 28, 2015, 10 pgs.
Owen, William H.; Mexico Office Action for serial No. MX/a/2012/013270, filed May 23, 2011, mailed Mar. 19, 2015, 3 pgs.
Holmes IV, William W.; Notice of Allowance for U.S. Appl. No. 14/448,655, filed Jul. 31, 2014, mailed Jul. 20, 2015, 9 pgs.
Holmes IV, William W.; Mexico Office Action for serial No. MX/a/2013001186, filed Aug. 24, 2011, mailed May 20, 2015, 4 pgs.
Holmes, William W.; Australian Examination Report for serial No. 2011293430, filed Aug. 24, 2011, mailed Jun. 5, 2015, 3 pgs.
Holmes IV, William W.; Corrected Notice of Allowability for U.S. Appl. No. 12/711,050, filed Feb. 23, 2010, mailed Nov. 19, 2014, 6 pgs.
Holmes IV, William W.; Issue Notification for U.S. Appl. No. 12/711,050, filed Feb. 23, 2010, mailed Dec. 17, 2014, 1 pg.
Holmes IV, William W.; Non-Final Office Action for U.S. Appl. No. 13/284,915, filed Oct. 30, 2011, mailed Feb. 2, 2015, 31 pgs.
Holmes IV, William W.; Non-Final Office Action for U.S. Appl. No. 14/448,655, filed Jul. 31, 2014, mailed Nov. 19, 2014, 32 pgs.
Holmes, William W.; Australian Examination Report for serial No. 2011293430, filed Aug. 24, 2011, mailed Nov. 28, 2014, 4 pgs.
Holmes IV, William W; Issue Notification for U.S. Appl. No. 13/955,692, filed Jul. 31, 2013, mailed Oct. 8, 2014, 1 pg.
German, Mikhail; Issue Notification for U.S. Appl. No. 12/902,888, filed Oct. 12, 2010, mailed Sep. 24, 2014, 1 pg.
Owen, William; Australian Patent Examination Report for serial No. 2011258534, filed May 23, 2011, mailed Jul. 17, 2014, 3 pgs.
Holmes IV, William W.; Final Office Action for U.S. Appl. No. 13/284,915, filed Oct. 30, 2011, mailed Sep. 4, 2015, 26 pgs.
Holmes IV, William W.; Final Office Action for U.S. Appl. No. 13/216,523, filed Aug. 24, 2011, mailed Aug. 3, 2015, 15 pgs.
Holmes IV, William W.; Notice of Allowance for U.S. Appl. No. 13/216,523, filed Aug. 24, 2011, mailed Oct. 8, 2015, 11 pgs.
Holmes IV, William W.; Issue Notification for U.S. Appl. No. 14/448,655, filed Jul. 31, 2014, mailed Aug. 12, 2015, 1 pg.
Holmes, William W.; Office Action for Mexico Patent Application No. MX/a/20121004119, filed Feb. 23, 2010, mailed Jun. 30, 2016, 4 pgs.
Holmes, William W.; Office Action for Canadian patent application No. 2,776,816, filed Feb. 23, 2010, mailed Feb. 19, 2016, 3 pgs.
Holmes, William W.; Office Action for Canadian patent application No. 2,776,816, filed Feb. 23, 2010, mailed Aug. 9, 2016, 3 pgs.

\* cited by examiner

SELF-RESTRAINED PIPE JOINT METHOD OF ASSEMBLY

REFERENCE TO RELATED APPLICATIONS

This application is a divisional of U.S. application Ser. No. 12/902,888, filed Oct. 12, 2010, now U.S. Pat. No. 8,857,861 B1 which claims priority to U.S. Provisional Application No. 61/250,742, filed Oct. 12, 2009, both of which are hereby specifically incorporated by reference herein in their entireties.

TECHNICAL FIELD

The present invention relates generally to the field of connections between lengths of pipe, or between pipes and fittings. More particularly, this invention is directed towards self-restrained sealing systems and methods of connecting two sections of pipe or pipe and piping appurtenances such as valves, fittings, hydrants and the like.

BACKGROUND

The construction of pipelines generally involves the axial connection of two lengths of pipe to form a single pipeline conduit for transporting materials from one point to another. Along the pipeline there may be one or more fittings, which allow the pipe pieces to be joined to other components in the pipeline. The materials usually conveyed via pipelines require that pipeline conduits and joints between axially joined pieces of pipe, and between pipes and fittings, he substantially leak-proof.

Some applications require that the joints between pipe components are restrained in some manner. This is usually desired in order to prevent the pipe components from separating due to thrust forces that often occur when the pipeline is subjected to internal pressure, and sometimes, when earth tremors or other external events occur. A challenge is to make the assembly of the pipe joints as simple, economical, and reliable as possible. Due to this, the industry has focused substantial attention on the problem of maintaining connections between adjacent lengths of pipe after installation. The result of this attention is a variety of differing designs and approaches known in the art. The majority of these designs can be categorized into either "mechanical joints" or "push-on joints."

The term "pipe" as used herein shall be understood to include pipe sections, fittings, connections, and any other appurtenances to pipes.

One of the well-known and the most common sealing systems used in the industry is referred to as a "mechanical joint" or simply as "MJ". The bell end of one pipe has a cast flanged portion that is capable of receiving an elastomeric gasket. A male piping member (spigot end) of a second pipe is fitted with an elastomeric gasket and gland fitting. The fitting and the bell flanged portion have a plurality of apertures for receiving standard bolts. Before assembling the MJ connection, the fitting and the elastomeric gasket are placed over the spigot end of the second pipe. A pressure tight joint is formed when the spigot is axially inserted into the bell, and the fitting and the bell flanged portion are bolted together causing the fitting to compress the elastomeric gasket, thus sealing the two pipe pieces.

The MJ connection enjoys wide acceptance in the industry, and is the subject of national and international Standards such as ANSI/AWWA C111/A21.11-95, which is incorporated in its entirety herein by reference.

Numerous attempts have been made to improve upon the standardized mechanical joint. These attempts are almost uniformly characterized by the inclusion of an additional mechanism or attachment, creating a mechanical connection that resists separation of the pipes.

Such attempts often require modification of the bell or the gland fitting (or both). Examples include designs that employ locking inserts recessed within the gland such as U.S. Pat. No. 784,400 to Howe and designs that rely upon specially modified bolts having toothed cams that both pivot on and bite into the spigot as the bolts are hooked under a modified lip of the bell and forced into grooves in the gland such as U.S. Pat. No. 1,818,493 to McWane. However, these solutions cannot be applied to the existing standardized mechanical joint bells.

Further attempts employ additional restraining devices or teeth that are driven into the spigot as the gland fitting is tightened. In some cases, these devices or teeth are interposed between the gasket and the gland. In other cases, these devices or teeth are implemented in the elastomeric gasket. Included among these devices is U.S. Pat. No. 4,664,426 to Ueki and U.S. Pat. No. 7,207,606 to Owen et al. In other cases, these devices or teeth are implemented in the elastomeric gasket. This solution may be illustrated by U.S. Pat. No. 7,104,573 to Copeland; U.S. Pat. No. 7,108,289 to Holmes et al.; and U.S. Pat. Nos. 7,125,054 and 7,410,174 to Jones. However, the assembly of these modified MJ connections still involves in-field installation of the gland, gasket, bolts, and nuts, which can be time consuming.

Another common method for connecting pipes together involves the insertion of the spigot end of the first pipe into an expanded end of the second pipe, where the interior profile of the second pipe has been specially fabricated to accommodate specially shaped elastomeric gaskets. The elastomeric gasket is sized to accommodate the spigot end of the male piping member to be received. This connection type is known in the pipe industry as a "push-on joint." In-field assembly of the push-on connection is much simpler than the assembly of the MJ connection. It does not involve any bolts and nuts and requires less time for assembly than the MJ connection. The spigot end of the male piping member is inserted into the bell end of the second pipe, thus developing a sealing arrangement between two pieces of pipe. No follower ring, stuffing box, or other compression mechanism is typically presented in the push-on joint. Additionally, the typical push-on joint does not include a restraining mechanism, though such mechanisms as tie bars, concrete thrust blocks, screws, and additional ring attachments have been employed in some cases to provide restraining performance. Advancements in the art have led to innovations and modifications of push-on joints to include restraining rings. Examples of such restrained push-on joints include U.S. Pat. Nos. 3,963,298 and 4,229,026 to Seiler U.S. Pat. Nos. 5,295,697 and 5,464,228 to Weber et at and U.S. Pat. No. 5,067,751 to Walworth et al. In some designs, the securement of the connection is effected by locking segments spaced uniformly around the elastomeric gasket inner perimeter. The toothed segments possess a groove that mates with an annular rib on the bell, such that the rib acts as a rocker, or cam, or, during some movements, as a wedge. During insertion of the spigot into the bell, the segments rotate on the rib, but are prevented from appreciable straight-line movement by engagement of the rib and groove. Upon experiencing counter-forces tending to effect removal of the spigot, the rib acts as a cam, both causing the segments to pivot on the rib, and exerting a radially inward pressure as the segments attempt to slide past the rib. These self-restraining gaskets, however, cannot be used with the standard bells for connection because of their specific shape and rib requirement.

What is needed therefore is a self-restrained pipe joint system that may be used with standard mechanical joint bell and which may possess combined advantages of the push-on and mechanical joints, such as easy in-field assembling and disassembling.

SUMMARY

Various embodiments of the present invention provide improved self-restrained pipe joint systems and methods that may be used with standard mechanical joint bells. In one aspect of the invention, a mechanical pipe joint system for joining a male piping member having an outer surface with an outer diameter and female piping member having a bell portion configured to receive a portion of the male piping member and defining an inner surface having a diameter greater than the outer diameter of the male piping member outer surface so as to define a sealing cavity therebetween when joined is provided. The joint system includes a retaining flange configured to be attached to the female piping member and defining a circular opening sized to accommodate the male piping member; and a restraining gasket for sealing and restraining the male piping member relative to the female piping member. The restraining gasket includes a sealing portion configured to be disposed substantially within the sealing cavity and to discourage fluid leakage between the inner surface of the female piping member opening and the outer surface of the male piping member, a flange portion configured to position the restraining gasket relative to the retaining flange, and a restraining portion comprising a plurality of circumferentially-spaced restraining segments formed from a material harder than a material of the male piping member and configured to engage the outer surface of the male piping member, a surface of the sealing cavity, and the retaining flange so as to restrain the male piping member within the female piping member as an extractive force is applied to the male member of the pipe joint system.

In another aspect of the invention, a method of assembling a self-restrained pipe joint system is provided. This method includes the steps of: disposing a restraining elastomeric gasket within an opening of a female piping member; affixing a retaining flange to the end of the female piping member; and inserting a spigot end of a male piping member of the pipe joint system into the female member of the pipe joint system through a circular opening in the retaining flange.

DETAILED DESCRIPTION

Embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The pipe joint system and method of assembly embodiments of the present invention will be primarily described in conjunction with pipe joints suitable for round cross-section fluid pipelines. It should be understood, however, that the pipe joint system and method of assembly embodiments of the present invention can be used in conjunction with a variety of other applications, both in fluid pipe conduits and other types of pipelines. For example, the pipe joint system and assembly method embodiments may be utilized in conjunction with gas pipelines and other applications requiring secure, fluid tight connections between adjacent piping conduits having various cross-sectional shapes.

Embodiments of the present invention are described below primarily in conjunction with a pipe joint system connecting an elongate female pipe section comprising a bell socket with a male pipe section. However, it should be understood that embodiments of the present invention may be used with a variety of fluid piping members, including adjoining male and female pipe terminal fittings and other pipe fittings having bell sockets attached thereto and configured to receive a male piping member.

Figure 1:
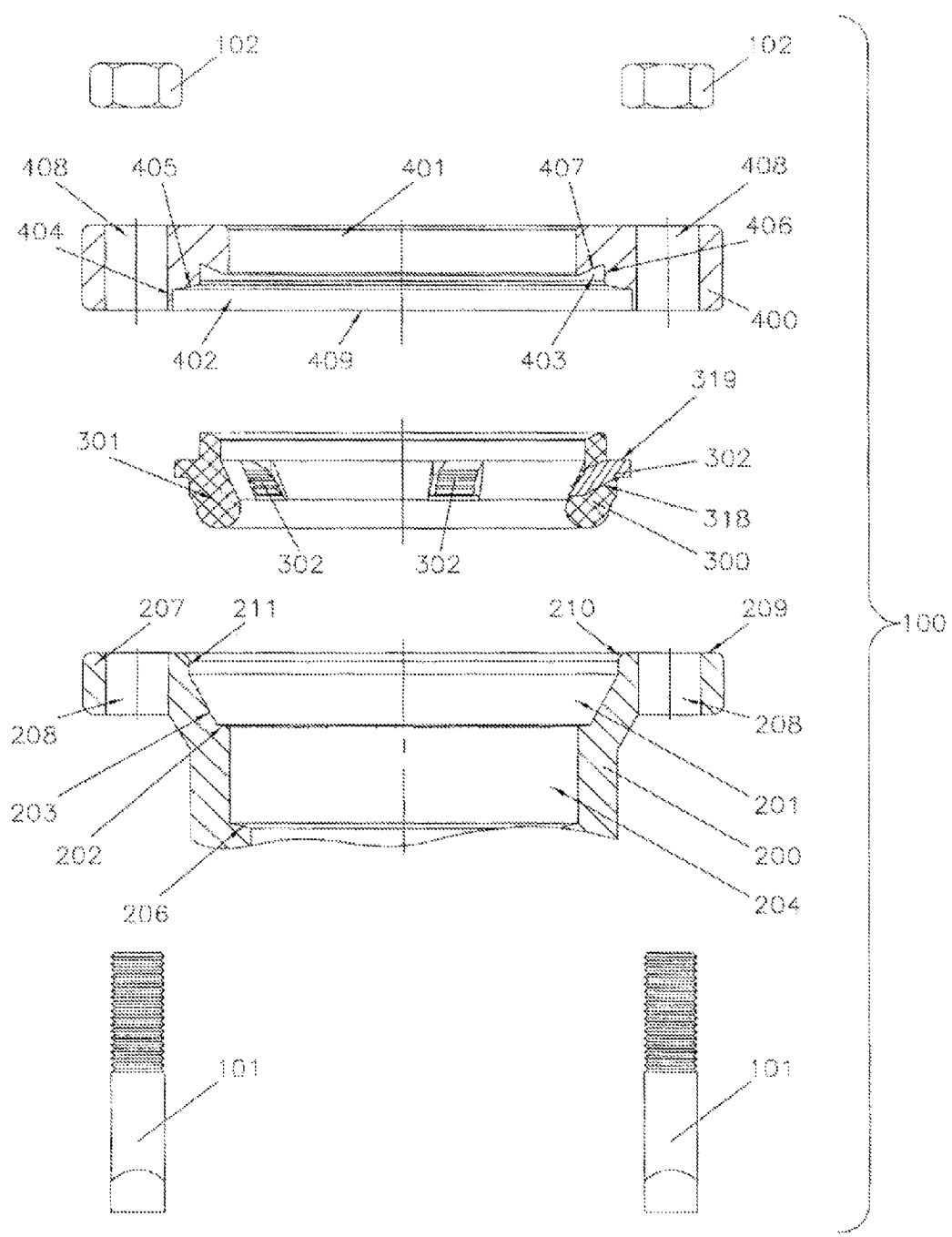
FIG. 1 is a side cross-sectional exploded view of a female member of a pipe joint system, in accordance with an embodiment of the present invention, ready to be assembled
Figure 2:
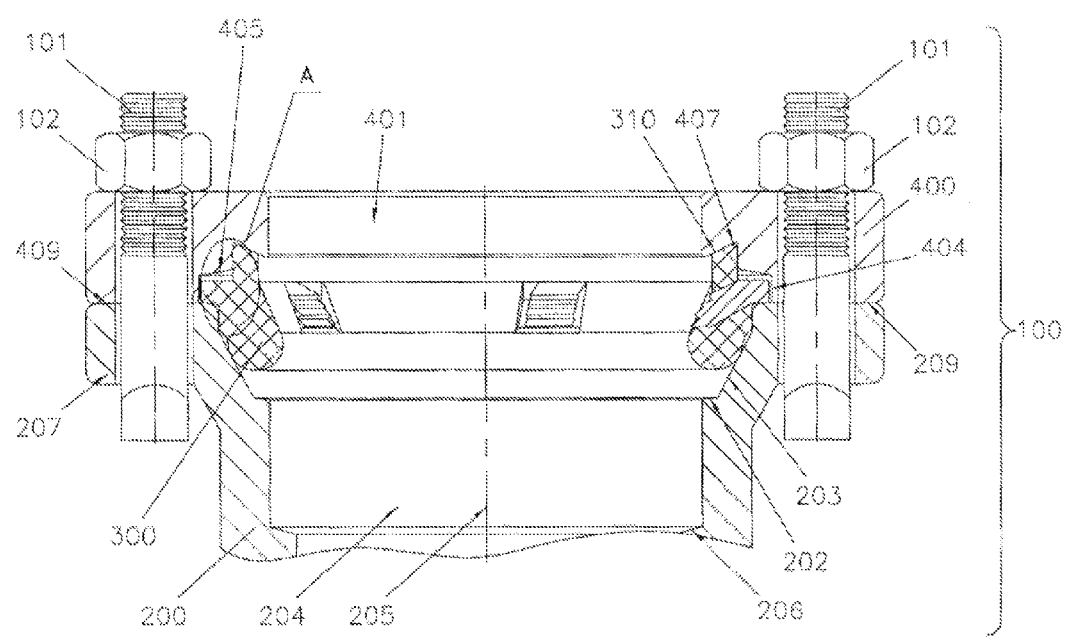
FIG. 2 is a side, cross-sectional view of the assembled female member of the pipe joint system, in accordance with an embodiment of the present invention, ready to receive a male member of a pipe connection.
Figure 3:
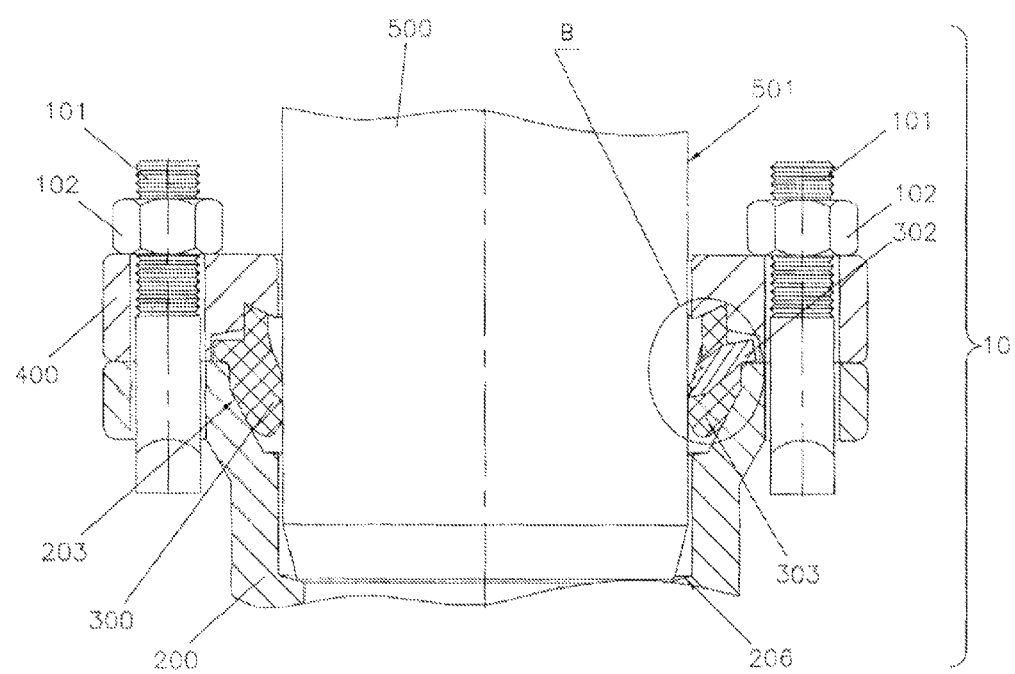
FIG. 3 is a side cross-sectional view of the assembled pipe joint system in accordance with an embodiment of the present invention.

FIGS. 1 and 2 illustrate the side cross-sectional views of the female member 100 of a pipe joint system 10 (See FIG. 3). More specifically, FIG. 1 presents an exploded diagram of the female member 100 of a pipe joint system 10 ready to be assembled, while FIG. 2 illustrates the assembled female member 100 of a pipe joint system 10, ready to receive axially a male member of the pipe joint system. As illustrated in FIGS. 1 and 2, the female member of the pipe joint system 100 may include a female piping bell end 200, a restraining elastomeric gasket 300, a retaining flange 400, and the bolts 101 and associated nuts 102. An inner surface of the female piping bell end 200 may have a standard MJ retainer groove 201 for retaining the gasket 300. The groove 201 defines a curvilinear surface 210, a cylindrical surface 211, a retainer wall 203, and a front wall 202. In addition, the female piping bell end has a cylindrical portion 204 that extends longitudinally from the front wall 202 parallel to the female piping axis 205 to a shoulder portion 206. The female piping bell end 200 also may have a flange 207, which may include a plurality of apertures 208 sized to receive the bolts 101.

Figure 7:
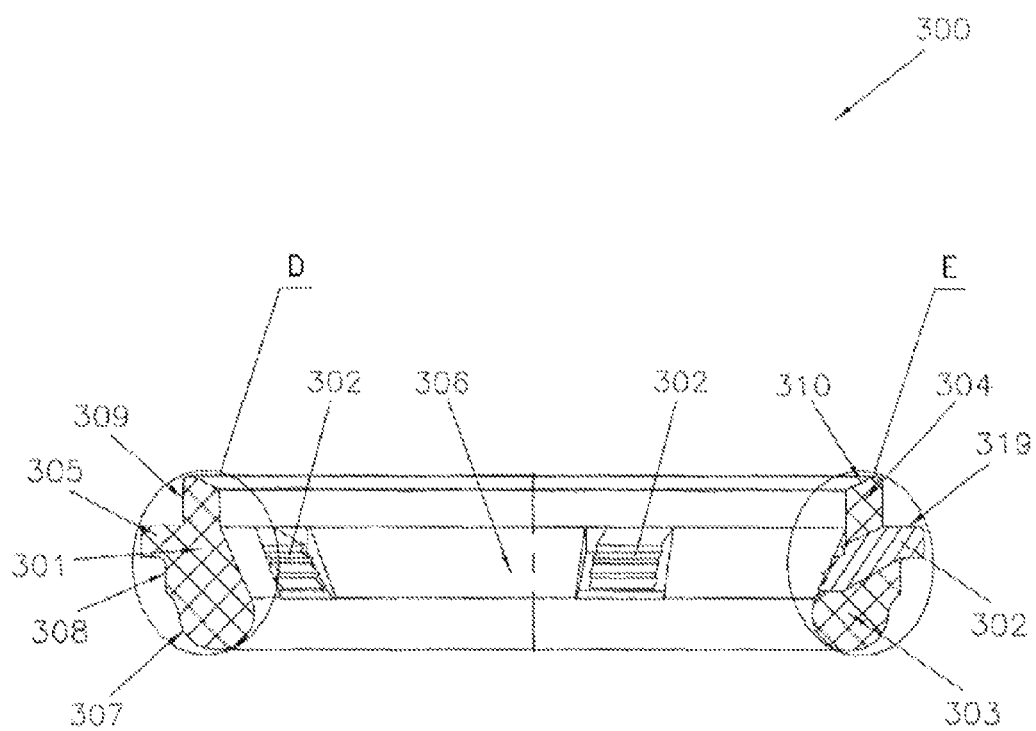
FIG. 7 is a cross-sectional view of the elastomeric gasket with the restraining segments, in accordance with an embodiment of the present invention, taken from the line C-C in FIG. 6.
Figure 8:
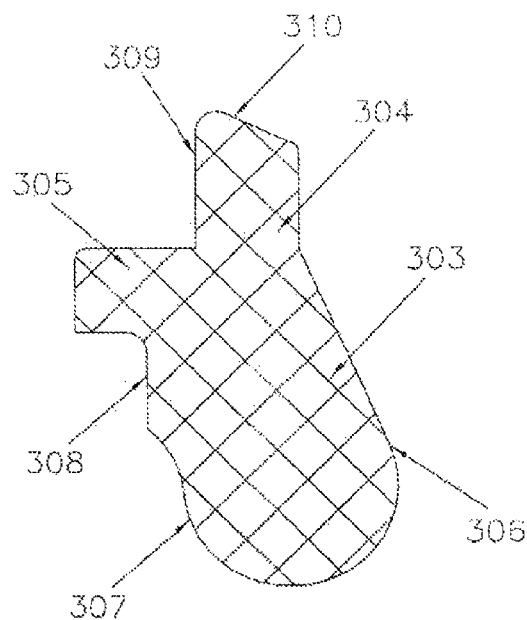
FIG. 8 is a close-up view of a detail D of the elastomeric gasket, in accordance with an embodiment of the present invention, shown in FIG. 7.

As shown in FIG. 1 the self-restrained gasket 300 may include an annular body 301 and a plurality of restraining segments 302. Referring to FIG. 7, the body 301 may include a sealing portion 303, a retaining portion 304, and a flanged portion 305. The sealing portion 303 of the gasket 300 may be composed of an elastomeric material so as to provide a substantially fluid tight seal between the male piping member 500 and the retaining groove 201 of the female piping bell end 200 as will be discussed in greater detail later (See FIG. 2). The sealing portion 303 of the gasket 300 has inner and outer sealing surfaces 306 and 307, respectively. The outer sealing surface 307 is configured to fit within a standard mechanical joint bell without necessitating any changes to the configuration of the female piping bell end 200 or spigot end of a male piping member 500. The outer sealing surface 307 may have a cylindrical portion 308. To obtain compression between the gasket 300 and the female piping bell retaining groove 201 when installed, the diameter of the gasket cylindrical portion 308 may be slightly larger than the diameter of the cylindrical surface 211 of the retaining groove 201 of the female piping bell end 200. The flanged portion 305 of the gasket 300 provides a mechanism for securing the gasket 300 in the assembled female member of the pipe joint system 100 and restricting the movement of the gasket 300 in the direction parallel to the female piping axis 205 (See FIG. 2). The retaining portion 304 of the elastomeric gasket 300 may have a cylindrical outer surface 309 and a frusto-conical surface 310, disposed on the inner surface of the retaining portion 304.

Figure 4:
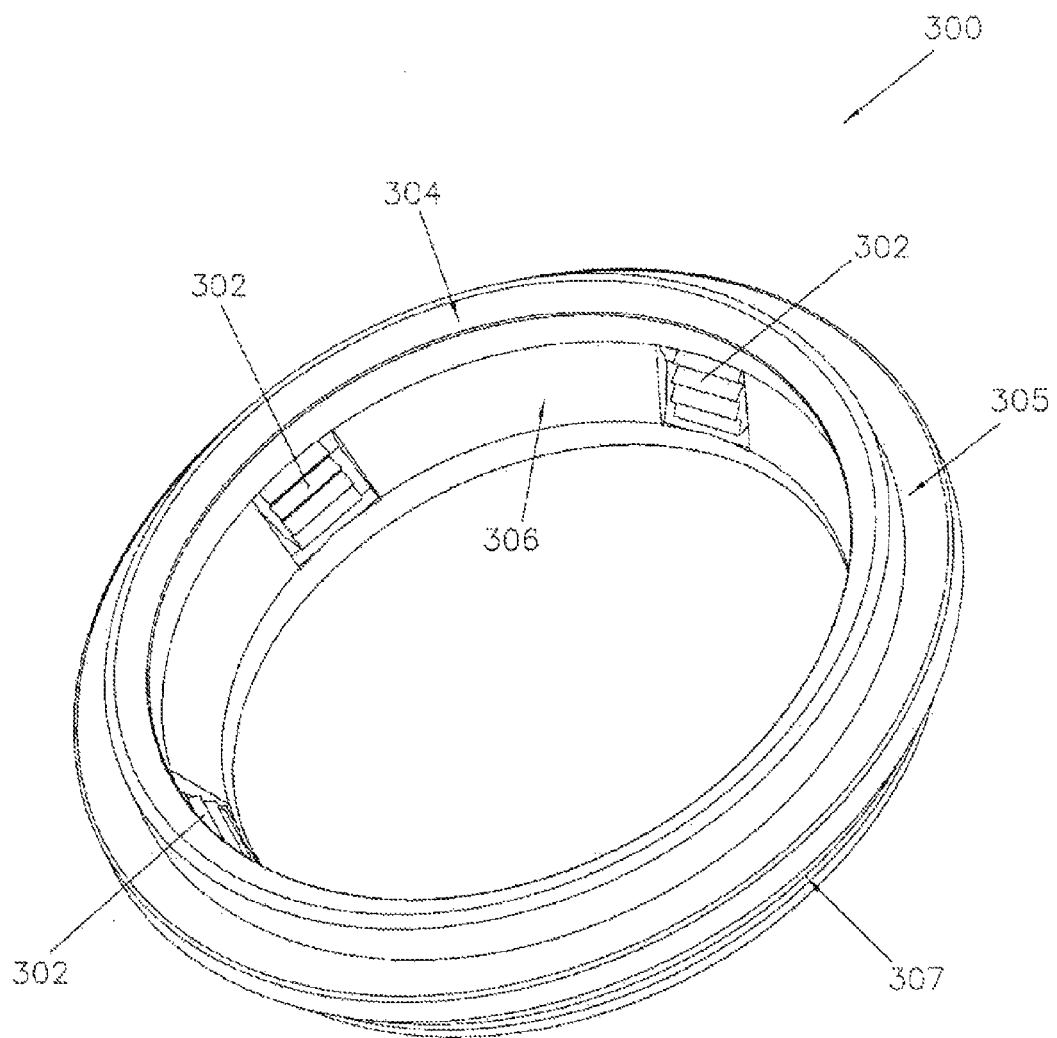
FIG. 4 is an isometric view of an elastomeric gasket of the pipe joint system in accordance with an embodiment of the present invention.
Figure 5:
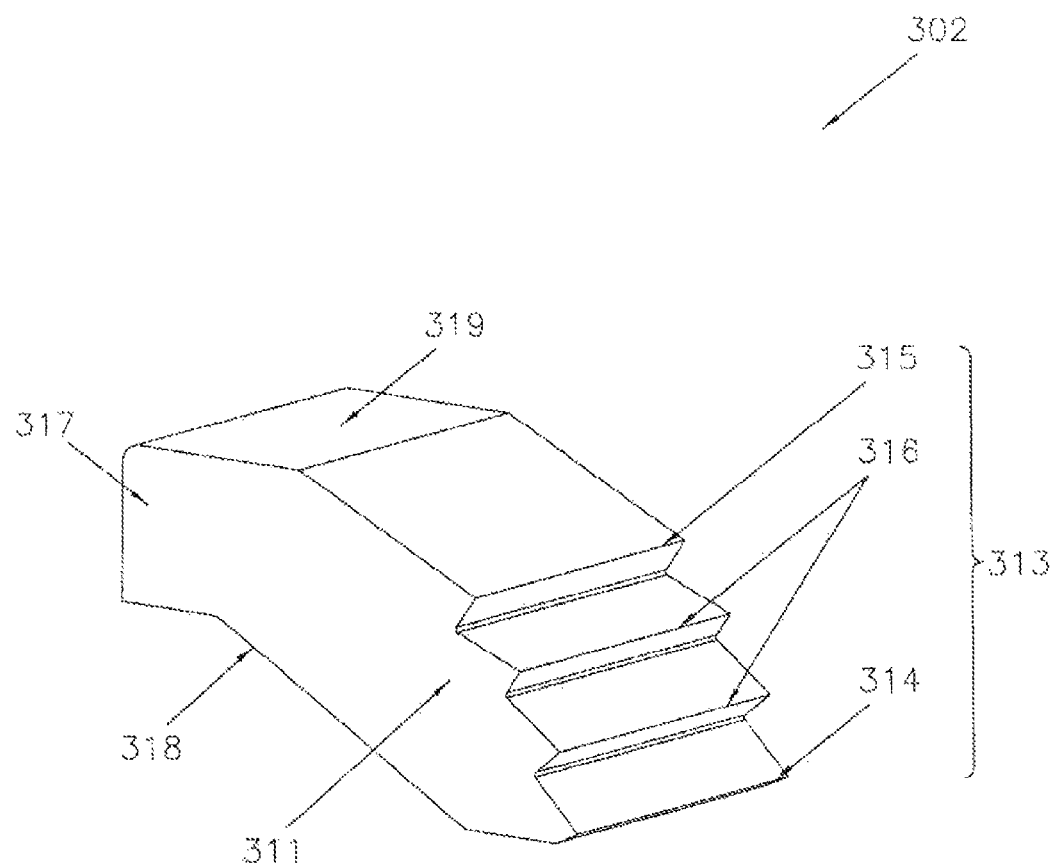
FIG. 5 is an isometric view of a restraining segment of the pipe joint system in accordance with an embodiment of the present invention.
Figure 6:
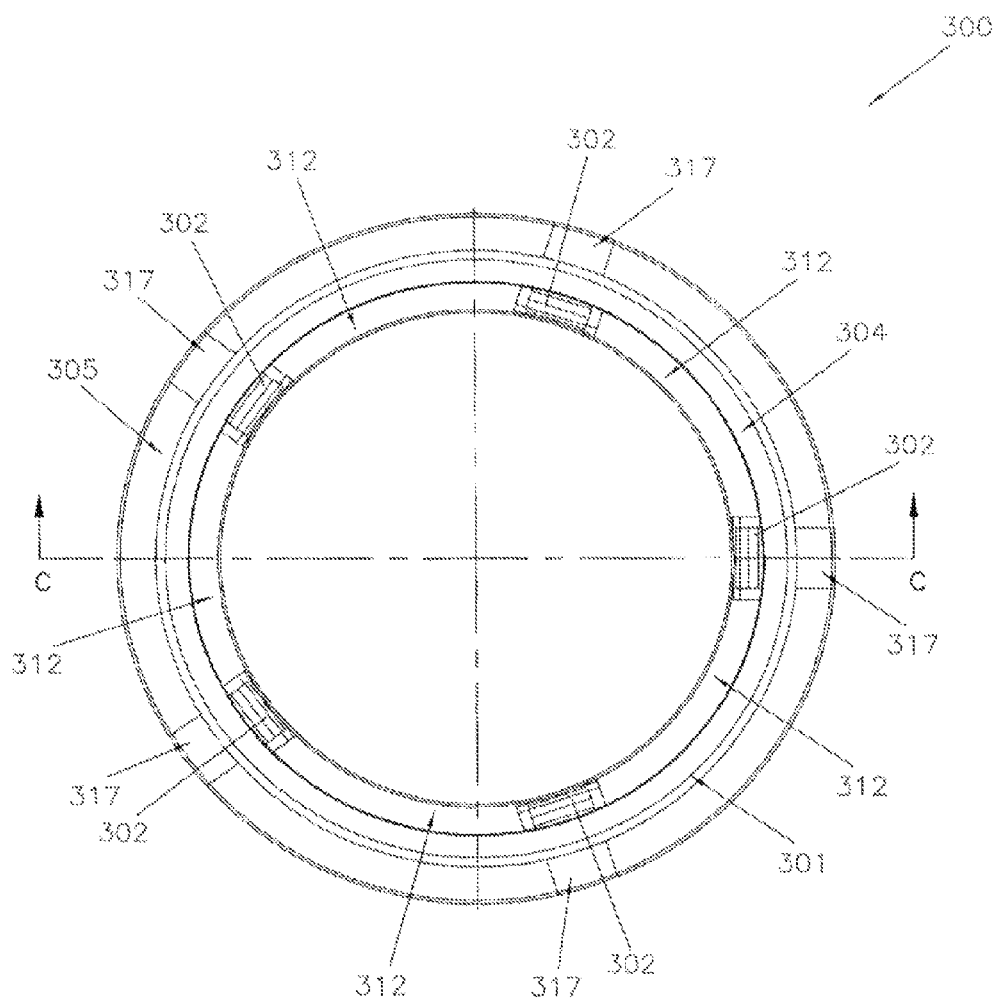
FIG. 6 is a top view of the elastomeric gasket with the restraining segments of the pipe joint system in accordance with an embodiment of the present invention.

As shown in FIGS. 4, 6 and 7, the restraining portion of the restraining elastomeric gasket 300 is composed of a plurality of circumferentially-spaced restraining segments 302 formed out of a rigid material. The restraining segments 302 can be composed of any material harder than the material of the male piping member 500. The number of such restraining segments 302 may depend upon the expected separative forces to be encountered by the pipe joint system 10, with a higher force tending to recommend a larger number of restraining segments 302. Each restraining segment 302 may include two portions: a restraining portion 311 and a back or supporting portion 317 (See FIGS. 5 and 9).

The restraining segments 302 may be integrally molded within the gasket elastomeric body 301 so that the restraining segments 302 are at least partially embedded within the resilient elastomeric material. The restraining segments 302 are preferably either bonded to the material of the gasket elastomeric body 301 during the curing or manufacturing process, or are held in place by a suitable adhesive or by other mechanical methods. The restraining segments 302 are retained relative to each other by segments of the elastomeric material 312 extending radially between adjacent restraining segments 302 as shown in FIG. 6.

Figure 11:
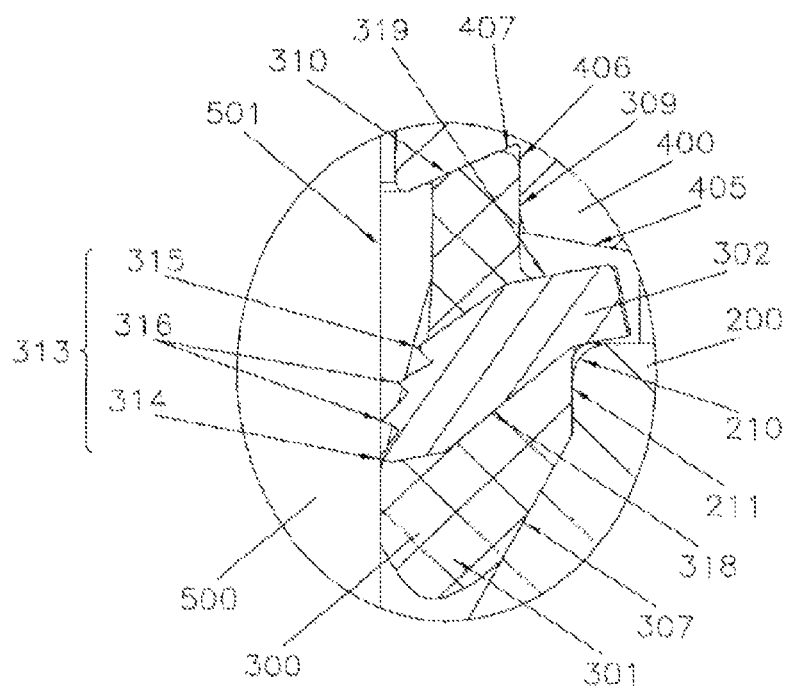
FIG. 11 is a close-up view of a detail B of the assembled pipe joint system, in accordance with an embodiment of the present invention, shown in FIG. 3.

The supporting portion 317 of the restraining segment 302 may protruded horizontally outward of the restraining portion 311 (see FIG. 11). As it shown in FIG. 6, the supporting portion 317 of the restraining segment 302 may be embedded in the flanged portion 305 of the gasket elastomeric body 301.

Figure 9:
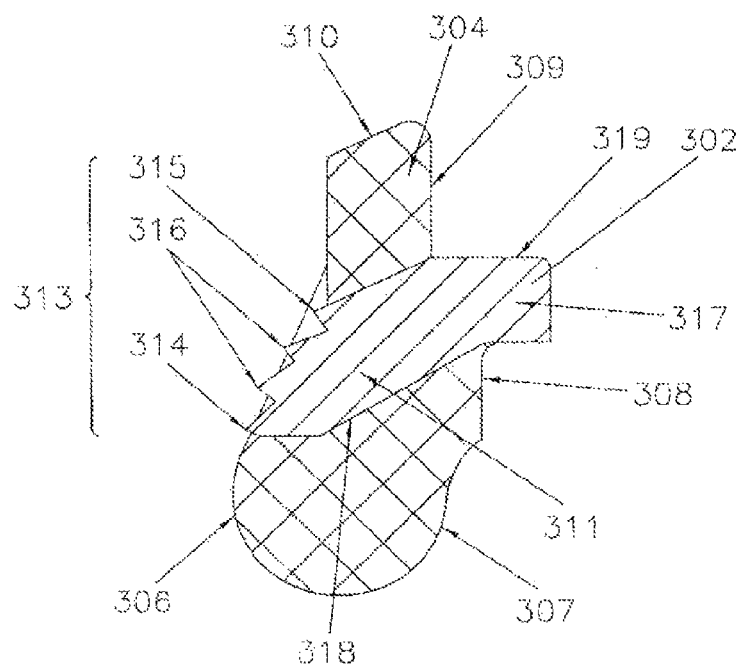
FIG. 9 is a close-up view of a detail E of the elastomeric gasket with the restraining segments, in accordance with an embodiment of the present invention, shown in FIG. 7.

In various embodiments, as shown in FIGS. 5, 9, and 11, the restraining segment 302 possesses a plurality of teeth 313 for engaging the outer surface 501 of the male piping member 500. The plurality of teeth 313 on the restraining segments 302 are presented to the male piping member 500 at different radial spacings to compensate for possible variations in the male piping member 500 diameter within the tolerance limits of the size of pipe to be employed. The rearward most teeth 314 on the restraining segments 302 collectively define an opening having a diameter slightly smaller than a pipe having the smallest possible diameter that could be employed in the joint. Further, the forward most teeth 315 on the restraining segments 302 may collectively define an opening having a diameter slightly smaller than a diameter of the male pipe having the largest possible diameter that is capable of being employed in the joint. One or more intermediate teeth 316 may be provided on each of the restraining segments 302, which serve to improve the gripping force of the restraining segments 302 on the inserted male piping member 500. With the additional teeth, the number of contact surfaces on the male pipe is increased thereby giving the restraining segments 302 the ability to create a larger footprint on the outer surface 501 of the male piping member 500. The larger contact surface reduces stresses on the male piping member 500 at the locking members' locations.

The retaining flange 400 (See FIGS. 1 and 2) may have a circular opening 401 to accommodate the male piping member 500. The diameter of the opening 401 may be slightly larger than the diameter of the male piping member 500 having the largest possible diameter that is capable of being employed with the joint. The retaining flange 400 may also have two counterbores 402 and 403. The lower counterbore 402 is bounded by a circular wall 404 leading to a frusto-conical surface between the counterbore 402 and the counterbore 403 (See FIGS. 1 and 2). A lower counterbore 402 is sized to accommodate the flanged portion 305 of the restraining elastomeric gasket 300. The diameter of the circular wall 404 of the lower counterbore 402 may be slightly larger than the outer diameter of the flanged portion 305 of the gasket 300. An upper or retaining counterbore 403 may provide a mechanism for securing and positioning the gasket 300 in the retaining flange 400 during assembly of the female member of the pipe joint assembly 100 (See FIGS. 2, 10, and 11). To facilitate positioning of the gasket 300 in the flange 400, the diameter of the circular retaining wall 406 of the retaining counterbore 403 may be slightly smaller than the diameter of the cylindrical outer surface 309 of the retaining portion 304 of the elastomeric gasket 300. A frusto-conical surface 407 of the retaining counterbore 403 in conjunction with the circular retaining wall 406, discourages the elastomeric gasket 300 with the restraining segments 302 from collapsing radially inward during an assembly of the female member of the pipe joint assembly 100. As it shown in FIG. 1, the retaining flange 400 may include a plurality of apertures 408.

Standard MJ bell connections typically require full infield assembly, which is time consuming and costly. Unlike these connections, the connection in accordance with various embodiments of the present invention allow pre-assembly of the female member of the pipe joint system 100 before in-field assembly of the pipe system.

Figure 10:
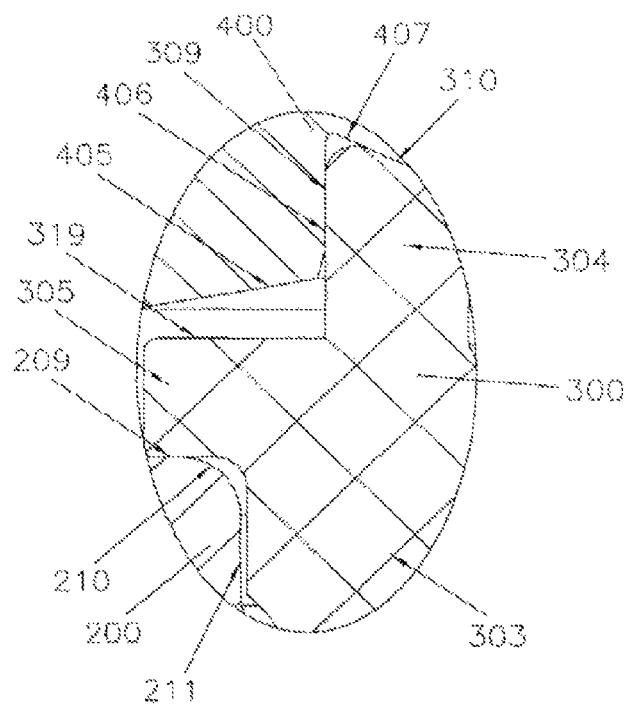
FIG. 10 is a close-up view of a detail A of the assembled female member of a pipe joint system, in accordance with an embodiment of the present invention, shown in FIG. 2.

Referring to FIGS. 2 and 10; the restraining elastomeric gasket 300 is assembled with the retaining flange 400 by inserting the retaining portion 304 of the gasket elastomeric body 301 in the retaining counterbore 403 of the retaining flange 400. In various embodiments, the outer diameter of the retaining portion 304 of the gasket elastomeric body 301 is slightly larger than the diameter of the retaining counterbore 403 of the retaining flange 400 and the slight interference fit between the outer cylindrical surface 309 of the retaining portion 304 of the gasket elastomeric body 301 and the circular retaining wall 406 of the retaining counterbore 403 of the retaining flange 400 can aid in positioning and retaining the restraining elastomeric gasket 300 during assembly of the female member 100 of the pipe joint system 10 (See FIG. 10). The interaction between the frusto-conical shaped surface 310 of the retaining portion 304 of the gasket elastomeric body 300 and the frusto-conical shaped surface 407 of the retaining counterbore 403 of the retaining flange 400 discourages collapsing of the restraining elastomeric gasket 300 radially inward. Furthering the assembly of the female member 100 of the pipe joint system 10, the restraining elastomeric gasket 300, pre-assembled with the retaining flange 400, is placed within the female piping bell end 200, such that the lower surface 409 of the retaining flange 400 engages the outer flat surface 209 of the flange 207 of the female piping bell end 200 (See FIGS. 2 and 10). The retaining flange 400 is then secured in place by the bolts 101 and associated nuts 102. Now, the female member 100 of the pipe joint system 10 is ready for the in-field installation of the pipe line system. Like the push-on pipe joint system assembly, assembly of the pipe joint system in accordance with various embodiments of the present invention only requires in-field insertion of the male piping member 500 into the pre-assembled female member 100 of the pipe joint system 10 (See FIG. 3).

Upon insertion of the male piping member 500 into the female piping bell end 200, the teeth 313 of the restraining segment 302 are forced radially outward by the presence of the male piping member 500. In various embodiments, the supporting portion 317 of the restraining segment 302 engages surface 209 of the female piping bell end 200. As the male pipe is installed, the restraining segment 302 rotates with the supporting surface sliding into engagement with the curvilinear surface 210. (See FIG. 11). In various embodiments, the volume of compressible elastomeric material presented between the lower surface 318 of the restraining portion 311 of the segment 302 and the outer sealing surface 307 of the gasket 300 allows for such outward movement without compromising the integrity of the gasket 300. As it shown in FIG. 11, even when the restraining segment 302 rotates radially outward, at least one of the teeth 313 will be in contact with the outer surface 501 of the male piping member 500. The male piping member 500 may be advanced as in the prior art until stopped by the shoulder region 206 of the female piping bell end 200 (See FIG. 3). The rotating of the restraining segments 302 combined with an interaction between the inner sealing surface 306 of the gasket elastomeric body 301, and the male piping member outer surface 501 causes the sealing portion 303 of the gasket 300 to be compressed to form a fluid seal arrangement between the male piping member outer surface 501 and the retainer wall 203 of the retaining groove 201 of the female piping bell end 200. The joint is now sealed and fluid under pressure can be carried by the pipe joint system 10.

As the fluid pressure rises, the male piping member 500 may be urged to move out of the female piping bell end 200 of the female member 100 of the pipe joint system 10. To counteract this force, as the male piping member 500 tries to move out of the female piping bell end 200, at least one of the teeth 313 digs into the outer surface 501 of the male piping member 500 as the restraining segments 302 tend to move in a direction of the retaining flange 400 such that the surface 319 engages surface 405. This engagement will cause the restraining segment 302 to pivot inward around a point of contact between an upper surface 319 of the supporting portion 317 of the restraining segment 302 and the frusto-conical shaped surface 405 of the lower counterbore 402 of the retaining flange 400 (See FIG. 11). The frusta-conical shaped surface 405 urges the restraining segments 302 to move inwardly causing even dipper digging of the teeth 313 into the outer surface 501 of the male piping member 500.

In summary, embodiments of the self-restrained pipe joint system combine the advantages of using widely popular standard mechanical joint piping bell and the simplicity of the in-field push-on joint connection assembly.

Many modifications and other embodiments of the invention set forth herein will come to mind to one skilled in the art to which these invention pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method of assembling a self-restrained pipe joint system, comprising the steps of:
    disposing an elastomeric restraining gasket within an opening of a female piping member;
    affixing a retaining flange to the end of the female piping member, wherein affixing the retaining flange to the end of the female piping member includes engaging the retaining flange with the gasket and the female piping member, and wherein engaging the retaining flange with the gasket includes accommodating a flanged portion of the gasket in a lower counterbore of the retaining flange; and
    inserting a spigot end of a male piping member of the pipe joint system into the female piping member of the pipe joint system through a circular opening in the retaining flange.

2. The method of claim 1, wherein disposing the gasket within the opening of the female piping member includes engaging a supporting portion of a restraining segment of the gasket with a surface of the female piping member.

3. The method of claim 1, wherein disposing the gasket within the opening of the female piping member includes disposing the gasket within a retaining groove in the opening of the female piping member.

4. The method of claim 3, wherein disposing the gasket within the opening of the female piping member includes engaging a retaining wall of the retaining groove with an outer sealing surface of the gasket.

5. The method of claim 4, wherein engaging the retaining wall of the retaining groove with the outer sealing surface of the gasket forms a fluid tight seal.

6. The method of claim 1, wherein disposing the gasket within the opening of the female piping member includes securing the gasket to the female piping member at the flanged portion of the gasket.

7. The method of claim 1, wherein engaging the retaining flange with the gasket includes securing the gasket in a retaining counterbore in the retaining flange.

8. The method of claim 7, wherein securing the gasket in the retaining counterbore in the retaining flange includes securing a retaining portion of the gasket in the retaining counterbore in the retaining flange.

9. The method of claim 1, wherein engaging the retaining flange with the female piping member includes engaging a lower surface of the retaining flange with an outer surface of a flange of the female piping member.

10. The method of claim 1, wherein inserting the spigot end of the male piping member into the female piping member includes stopping the spigot end of the male piping member against a shoulder region of the female piping member.

11. The method of claim 1, wherein inserting the spigot end of the male piping member into the female piping member includes engaging a restraining segment of the gasket with the male piping member.

12. The method of claim 1, wherein inserting the spigot end of the male piping member into the female piping member includes forming a fluid tight seal.

13. The method of claim 12, wherein the fluid tight seal is formed by engaging an inner gasket surface with an outer surface of the male piping member.

14. The method of claim 12, wherein the fluid tight seal is formed by rotating a restraining segment of the gasket with the male piping member.

15. A method of assembling a self-restrained pipe joint system, comprising the steps of:
disposing a retaining portion of an elastomeric restraining gasket into a retaining counterbore of a retaining flange;
inserting a sealing portion of the restraining gasket, assembled with the retaining flange, within a sealing cavity of a female piping member, wherein affixing the retaining flange to the female piping member includes engaging the retaining flange with the restraining gasket and the female piping member, and wherein engaging the retaining flange with the restraining gasket includes accommodating a flanged portion of the restraining gasket in a lower counterbore of the retaining flange;
affixing the retaining flange to the female piping member; and
inserting a spigot end of a male piping member of the pipe joint system into the female piping member of the pipe joint system through a circular opening in the retaining flange.

16. The method of claim 15, wherein inserting the spigot end of the male piping member into the female piping member includes engaging a restraining segment of the gasket with the male piping member.

17. The method of claim 15, wherein inserting the spigot end of the male piping member into the female piping member includes forming a fluid tight seal.

18. The method of claim 17, wherein the fluid tight seal is formed by rotating the restraining segment of the gasket with the male piping member.

19. A method of assembling a self-restrained pipe joint system, comprising the steps of:
disposing a restraining elastomeric gasket within an opening of a female piping member;
affixing a retaining flange to the end of the female piping member, wherein affixing the retaining flange to the end of the female piping member includes engaging the retaining flange with the gasket and the female piping member, and wherein engaging the retaining flange with the gasket includes securing the gasket in a retaining counterbore in the retaining flange; and
inserting a spigot end of a male piping member of the pipe joint system into the female piping member of the pipe joint system through a circular opening in the retaining flange.

20. The method of claim 19, wherein securing the gasket in the retaining counterbore in the retaining flange includes securing a retaining portion of the gasket in the retaining counterbore in the retaining flange.

21. A method of assembling a self-restrained pipe joint system, comprising the steps of:
disposing a retaining portion of an elastomeric restraining gasket into a retaining counterbore of a retaining flange;
inserting a sealing portion of the restraining gasket, assembled with the retaining flange, within a sealing cavity of a female piping member;
affixing the retaining flange to the female piping member, wherein affixing the retaining flange to the female piping member includes engaging the retaining flange with the restraining gasket and the female piping member, and wherein engaging the retaining flange with the restraining gasket includes securing the restraining gasket in a retaining counterbore in the retaining flange; and
inserting a spigot end of a male piping member of the pipe joint system into the female piping member of the pipe joint system through a circular opening in the retaining flange.

22. The method of claim 21, wherein securing the restraining gasket in the retaining counterbore in the retaining flange includes securing a retaining portion of the restraining gasket in the retaining counterbore in the retaining flange.

* * * * *